3,534,093
ETHYLENE OXIDATION IN THE PRESENCE OF PALLADIUM METAL

Harold R. Gerberich and William K. Hall, Pittsburgh, Pa., assignors to Gulf Research & Development Company, Pittsburgh, Pa., a corporation of Delaware
No Drawing. Filed Mar. 21, 1966, Ser. No. 535,692
Int. Cl. C07c 51/32
U.S. Cl. 260—533                                    7 Claims

ABSTRACT OF THE DISCLOSURE

Ethylene is oxidized with oxygen to acetic acid, acetaldehyde, etc. by passing over palladium metal or certain palladium-gold alloys at a space velocity of about 55 to about 500 while the temperature is about 50° to about 150° C. and the oxygen partial pressure is above about 0.5 pound per square inch absolute.

---

This invention relates to a process for oxidizing ethylene to obtain a useful mixture of organic compounds composed of acetaldehyde, acetic acid and acetic anhydride.

In addition to the above desirable oxygenated compounds undesired compounds, such as carbon dioxide and water, are also formed. We have found that the defined reaction can be rendered more selective to the formation of the desirable oxygenated compounds, with the formation of lesser amounts of water and carbon dioxide, by carrying out the process in the presence of a selected amount of palladium metal. We have additionally found that such selectivity can be increased further by carrying out the reaction in the presence of an alloy composed of palladium and gold. This is surprising, because our experimental results would lead us to the conclusion that gold alone is ineffective in the oxidation reaction of this invention.

We have found that in order to obtain good selectivity to the desired oxygenated compounds, it is imperative that the ethylene, together with oxygen, be passed over the palladium metal, or the palladium-gold alloy, surface at a rate such that the temperature of the reaction mixture remains at all times during the reaction period within a range of about 50° to about 150° C., preferably within a range of about 70° to about 100° C. Below the lower temperature limits the reaction rate becomes too low to be economically feasible, whereas at temperatures above the upper limits yields of desired oxygenated compounds decrease appreciably and excessive amounts of water and carbon dioxide are formed. Since the oxidation of an ethylene is accompanied by the release of large amounts of heat, it becomes critical to remove the reaction product from the reaction zone before the temperature thereof rises above the limits defined above. This is done, in accordance with the process defined herein, by passing the ethylene over the catlyst at a space velocity (volumes of ethylene measured at standard temperature and pressure, per volume of catalyst metal(s) per hour) of about 55 to about 500, preferably about 120 to about 240.

The reaction product can then be removed from the reaction zone and cooled to a suitably low temperature at which further undesired reactions have substantially ceased, for example, about 0° to about −135° C., in any suitable manner, for example, by indirect heat exchange with a cooling medium, such as water or liquid nitrogen, for purposes of condensing the desired oxygenated products and water. The unreacted ethylene can then be recycled to the reaction zone, if desired. In the event carbon dioxide is not removed prior to this, it can be removed from the unreacted ethylene and oxygen by any conventional means, for example, by absorption in barium hydroxide solution.

The ethylene partial pressure in the reaction zone does not appreciably affect the desired selectivity, and any pressure thereof can be selected consistent with the remaining selected conditions. Thus, the partial pressure of the ethylene can be in the range of about 0.2 to about 2000 pounds per square inch absolute, preferably about 0.9 to about 500 pounds per square inch absolute. The partial pressure of the oxygen is critical, however, and must be above about 0.5 pounds per square inch absolute, preferably about 1.9 to about 2000 pounds per square inch absolute. Below about 0.5 pound per square inch absolute selectivity to desired oxygenated products decreases appreciably, whereas above about 1.9 pounds per square inch absolute selectivity to desired compounds remains substantially constant.

Although an alloy of palladium and gold will increase selectivity to desired oxygenated compounds in the process defined herein, this is so only when the amount of gold in the alloy is within the range of about 84.0 to about 91.9 percent by weight, preferably about 86.8 to about 90.2 percent by weight, based on the alloy. By "alloy" we mean to include a solid, homogeneous solution of the two metals, in which it can be stated each metal is dissolved in the other. Whether palladium alone is employed, or the palladium-gold alloy, the surface area of the catalyst will be in excess of about 0.01 square meters per gram, preferably within the range of about 0.2 to about 5.0 square meters per gram of catalyst.

The procedure of this invention can further be understood by reference to the following.

EXAMPLE I

A mixture of ethylene and oxygen was passed over palladium metal, the reaction product was then cooled to −135° C. by indirect cooling with liquid nitrogen to condense the reaction product, which consisted essentially of acetaldehyde, acetic acid, acetic anhydride, water and carbon dioxide, the unreacted ethylene and unreacted oxygen was then recycled over the palladium metal, and the reaction continued until a total of about 10 to about 25 percent by volume of the original ethylene was converted. The space velocity (volume of ethylene per volume of catalyst per hour) was maintained at 240 in each run. The data obtained are tabulated below in Table I.

TABLE I

| Experiment No. | Weight of palladium in grams | Surface area of palladium in meters² per gram | Temperature in reaction zone in ° C. | Initial pressure of ethylene in reaction zone in mm. Hg | Initial pressure of oxygen in reaction zone in mm. Hg | Percent selectivity to oxygenated products |
|---|---|---|---|---|---|---|
| 1 | 2.02 | 0.21 | 71 | 43 | 100 | 40 |
| 1 | 2.02 | 9.19 | 90 | 42 | 97 | 39 |
| 3 | 2.02 | 0.20 | 92 | 20 | 102 | 30 |
| 4 | 2.02 | 0.18 | 92 | 10 | 102 | 40 |
| 5 | 2.02 | 0.16 | 90 | 45 | 259 | 43 |
| 6 | 2.02 | 9.16 | 89 | 44 | 45 | 33 |
| 7 | 2.02 | 0.20 | 90 | 47 | 26 | 24 |
| 8 | 2.02 | 0.21 | 103 | 43 | 100 | 28 |
| 9 | 2.05 | 0.60 | 150 | 44 | 100 | 11 |

In the above table the oxygenated products comprised from about 70 to about 97 percent by weight of acetic acid, about 0 to about 15 percent by weight of acetic anhydride and about 3 to about 30 percent by weight of acetaldehyde, with the remainder being water and carbon dioxide. The data show that as the temperature levels were increased, selectivity to desired oxygenated compounds was reduced. In addition, the data show that as the oxygen pressure was reduced the selectivity of ethylene to desired oxygenated compounds was also reduced.

That increased selectivity to desired oxygenated compounds is obtained when a palladium-gold alloy is employed wherein the composition thereof is within the selected limits is apparent from the following.

EXAMPLE II

Additional runs were made using palladium alone and palladium-gold alloys following the procedure outlined above in Runs Nos. 1–9. In these runs the ethylene partial pressure was 44 mm. Hg ±3 mm. Hg, while the oxygen partial pressure was 100 mm. Hg ±3 mm. Hg. The data obtained are tabulated below in Table II.

TABLE II

| Experiment No. | Weight of alloy in grams | Percent by weight of gold in alloy | Surface area of catalyst in meters² per gram | Temperature in reaction zone in °C. | Space velocity of ethylene per volume of catalyst per hour | Percent selectivity to oxygenated products |
|---|---|---|---|---|---|---|
| 10 | 4.79 | 93.4 | 0.34 | 141 | 240 | 3.0 |
| 11 | 5.00 | 90.6 | 0.42 | 101 | 160 | 40 |
| 12 | 3.65 | 87.9 | 1.00 | 70 | 240 | 68 |
| 13 | 3.65 | 87.9 | 1.30 | 101 | 240 | 53 |
| 14 | 3.65 | 87.9 | 1.10 | 132 | 240 | 31 |
| 15 | 3.84 | 81.4 | 2.20 | 101 | 160 | 29 |
| 16 | 3.36 | 73.9 | 3.00 | 100 | 120 | 9.0 |
| 17 | 3.21 | 65.5 | 5.00 | 103 | 80 | 20 |
| 18 | 1.75 | 0.0 | 0.90 | 70 | 240 | 37 |

Table II clearly illustrates that an increase in selectivity to desired compounds can be obtained by employing a palladium-gold alloy as catalyst. However, merely using such an alloy is not enough if the proper amounts of palladium and gold are not present, for if certain alloys of palladium and gold are employed, selectivities to desired oxygenated compounds are obtained that are lower than those obtained using palladium alone. Thus, best results were obtained, as Experiment Nos. 12 and 13 show, when an alloy containing from about 8.1 to about 16.0 percent by weight of palladium and from about 84.0 to about 91.9 percent by weight of gold was used. When gold was present below and above such amounts, poorer selectivities to desired oxygenated compounds were obtained than when palladium alone was used. Substantially only gold resulted in selectivity to desired oxygenated compounds of only three percent.

Obviously many modifications and variations of the invention as hereinabove set forth can be made without departing from the spirit and scope thereof and therefore only such limitations should be made as are indicated in the appended claims.

We claim:

1. A process for producing a product comprising acetaldehyde, acetic acid and acetic anhydride, which process comprises reacting ethylene and oxygen in the absence of added water and in the contact presence of palladium metal under reaction conditions including an ethylene space velocity of about 55 to about 500 v./v./hr., a reaction temperature in the range of about 50° to about 150° C. and a partial pressure of oxygen above about 0.5 pound per square inch absolute.

2. The process of claim 1 wherein the temperature in the reaction zone is maintained in the range of about 70° to about 100° C.

3. The process of claim 1 wherein the partial pressure of oxygen is within a range of about 1.9 to about 2000 pounds per square inch absolute.

4. A process for producing a product comprising acetaldehyde and acetic acid, which process comprises reacting ethylene and oxygen in the contact presence of a catalyst under reaction conditions including an ethylene space velocity of about 55 to about 500 v./v./hr., a reaction temperature in the range of about 50° to about 150° C. and a partial pressure of oxygen above about 0.5 pound per square inch absolute; said catalyst comprising a palladium-gold alloy wherein the palladium is present within a range of about 8.1 to about 16.0 percent by weight and the gold is present within a range of about 84.0 to about 91.9 percent by weight.

5. The process of claim 4 wherein the temperature in the reaction zone is maintained within a range of about 70° to about 100° C.

6. A process according to claim 4 wherein the partial pressure of the oxygen is within a range of about 1.9 to about 2000 pounds per square inch absolute.

7. The process of claim 6 wherein the temperature in the reaction zone is maintained within the range of about 70° to about 100° C.

References Cited

UNITED STATES PATENTS

| | | |
|---|---|---|
| 3,439,044 | 4/1969 | Hirsch. |
| 3,365,498 | 1/1968 | Bryant. |
| 3,119,874 | 1/1964 | Paszthory et al. |
| 3,346,624 | 10/1967 | Schaeffer et al. |
| 3,293,291 | 12/1966 | Wattimena. |

LORRAINE A. WEINBERGER, Primary Examiner

D. E. STENZEL, Assistant Examiner

U.S. Cl. X.R.

260—604, 546

PO-1050
(5/69)

UNITED STATES PATENT OFFICE
CERTIFICATE OF CORRECTION

Patent No. 3,534,093          Dated October 13, 1970

Inventor(s) Harold R. Gerberich and William K. Hall

It is certified that error appears in the above-identified patent and that said Letters Patent are hereby corrected as shown below:

Columns 1 and 2, Table I, :

Under "Experiment No.", in the second line "1" should read -- 2 --;

Under "Surface area of palladium in meters$^2$ per gram":
      "9.19" should read -- 0.19 --;
      "9.16" should read -- 0.16 --.

SIGNED AND SEALED

FEB 23 1971

(SEAL)
Attest:

Edward M. Fletcher, Jr.
Attesting Officer

WILLIAM E. SCHUYLER, JR.
Commissioner of Patents